United States Patent [19]

Zona et al.

[11] Patent Number: 5,257,871
[45] Date of Patent: Nov. 2, 1993

[54] DEVICE FOR SUPPORTING A ROBOT ON A SUPPORT BEAM

[75] Inventors: Mauro Zona; Marco Bettinardi, both of Turin, Italy

[73] Assignee: Comau SpA, Turin, Italy

[21] Appl. No.: 770,210

[22] Filed: Oct. 3, 1991

[30] Foreign Application Priority Data

Oct. 4, 1990 [IT] Italy .................. 67760 A/90

[51] Int. Cl.⁵ .................................. F16B 2/02
[52] U.S. Cl. ........................ 403/24; 403/59; 294/106; 901/1; 104/93; 105/150
[58] Field of Search .......... 403/24, 59; 294/106, 294/113; 901/1, 27, 50; 242/142.1; 104/93, 119, 118, 120; 105/150, 144, 145

[56] References Cited

U.S. PATENT DOCUMENTS

| | | | |
|---|---|---|---|
| 3,345,951 | 10/1967 | Rethorst | 104/118 |
| 3,488,692 | 1/1970 | Oda et al. | 414/744.6 |
| 3,731,820 | 5/1973 | Niki et al. | 901/27 X |
| 3,795,421 | 3/1974 | Vohl et al. | 294/106 X |
| 4,540,212 | 9/1985 | Inaba et al. | 294/115 X |
| 4,957,320 | 9/1990 | Ulrich | 294/106 |

FOREIGN PATENT DOCUMENTS

| | | |
|---|---|---|
| WO8701672 | 9/1986 | PCT Int'l Appl. |
| WO8702640 | 10/1986 | PCT Int'l Appl. |
| 1268404 | 11/1986 | U.S.S.R. ............ 294/106 |
| 1414748 | 8/1988 | U.S.S.R. ............ 294/106 |

Primary Examiner—Randolph A. Reese
Assistant Examiner—Harry C. Kim
Attorney, Agent, or Firm—Sughrue, Mion, Zinn, Macpeak & Seas

[57] ABSTRACT

An articulated robot has a pincer-like attachment with a central part and two pivoting parts articulated to the central part, the attachment serving to connect the robot to a support beam in a fixed or slidable manner.

3 Claims, 1 Drawing Sheet

DEVICE FOR SUPPORTING A ROBOT ON A SUPPORT BEAM

BACKGROUND OF THE INVENTION

The present invention relates to articulated industrial robots and, in particular, to a device for supporting a robot on a support beam.

SUMMARY OF THE INVENTION

The object of the invention is to provide a device of this type which enables the robot to be mounted on and removed from the support beam quickly and easily and at the same time ensures that it is fixed securely.

In order to achieve this object, the subject of the invention is an articulated robot including an attachment member which can be mounted on a support beam, characterised in that the attachment member has a pincer-like body with a central portion and two side portions articulated to the central portion, the central portion being connected to the robot structure and the side portions being movable between closed positions for grasping the support beam when the attachment member is operative and open release positions.

In one embodiment, the attachment member also includes an auxiliary portion which can be fixed to the two side portions of the attachment member when they are in their operative positions so as to define a closed structure which completely surrounds the support beam.

In a particularly advantageous variant of the invention, the attachment member is slidable longitudinally on the support beam. In this variant, the side portions have revolving means for guiding the sliding of the attachment along the support beam.

BRIEF DESCRIPTION OF THE DRAWINGS

The invention will now be described with reference to the appended drawings, provided purely by way of non-limiting example, in which.

DETAILED DESCRIPTION OF THE INVENTION

Figure 1:
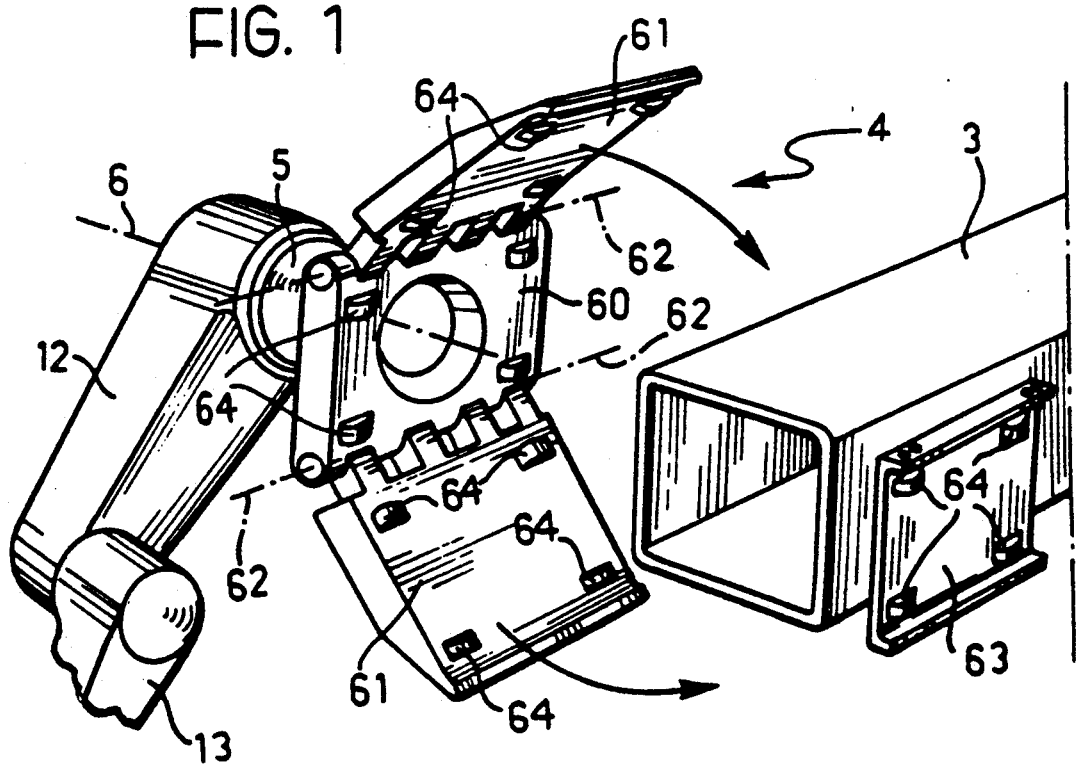
FIG. 1 is a perspective view of an embodiment of the attachment device according to the invention.
Figure 2:
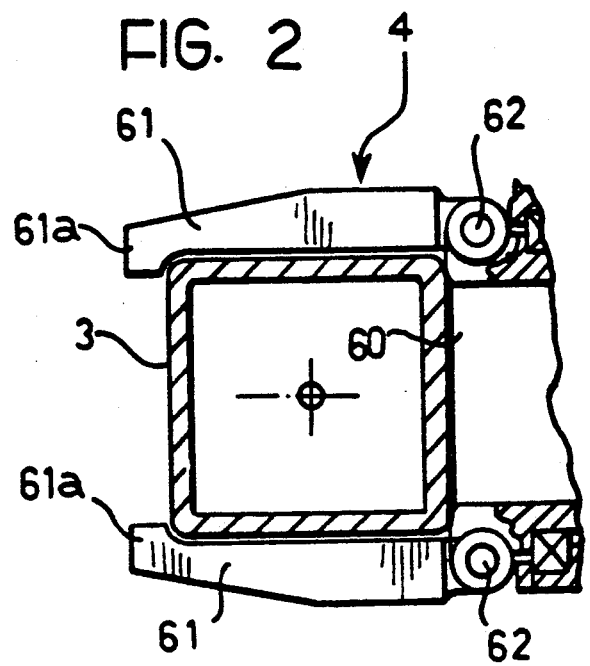
FIG. 2 is a partially-sectioned side view of the device of FIG. 1.

In the drawings, an attachment device, generally indicated 4, takes the form of a slide slidable on a tubular support beam 3 of square cross-section. The slide 4 has a pincer-like body with a central portion 60 which supports a base element 5 of the robot for rotation about an axis 6. The element 5 in turn supports a rotatable robot arm 12 carrying an articulated forearm 13. The slide also includes two side portions 61 articulated to the central portion 60 about two parallel axes 62. The side portions 61 are movable between open, inoperative positions (shown in FIG. 1) and closed, operative positions (FIG. 2) in which they engage two opposite sides of the support beam 3. Each side portion 61 may have a projecting end edge 61a which engages the side of the support beam opposite that engaged by the central portion 60 of the slide so as to restrain the slide on the beam. Alternatively (FIG. 1), an auxiliary portion 63 may be fixed to the end edges of the side portions 61 to form a closed structure which completely surrounds the support beam. The central portion 60, the side portions 61 and any further portion 63 have idle wheels 64 which engage the corresponding surfaces of the support beam 3 to enable the slide 4 to move along the beam.

Clearly, a configuration identical to that described above may be used to form an attachment for fixed connection to a support beam such as the beam 3. In this case, of course, there are no guide wheels 64.

Naturally, the principle of the invention remaining the same, the details of construction and forms of embodiment may be varied widely with respect to those described and illustrated purely by way of example, without thereby departing from the scope of the present invention. For example, the invention could be applied to a machine of any kind and not necessarily to a robot.

What is claimed is:

1. An articulated robot including an attachment member for mounting the robot on a support arm, wherein the attachment member has a pincer-like body with a central portion and two side portions articulated to the central portion, the central portion being connected to the robot structure and the side portions being movable between closed positions for grasping the support beam when the attachment member is operative, and open release positions, wherein the attachment member also includes an auxiliary portion which can be fixed to the two side portions when they are in their operative positions so as to define a closed structure which completely surrounds the support beam.

2. A robot according to claim 1, wherein the attachment member is slidable along the support beam.

3. A robot according to claim 2, wherein the central portion and the side portions have revolving means for guiding the sliding of the attachment member on the support beam.

* * * * *